July 20, 1926.
A. H. BASLER
MOLDED WHEEL DEVICE
Filed Nov. 9, 1925
1,593,238
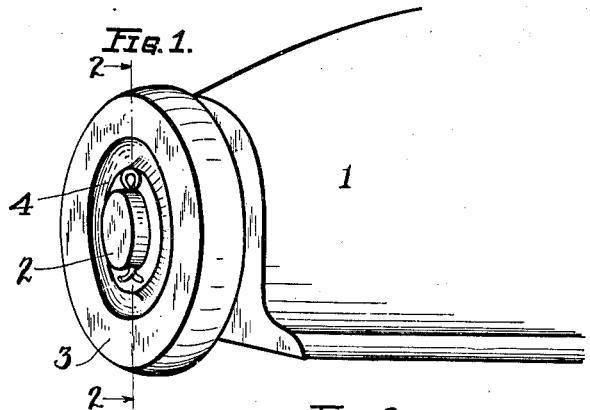
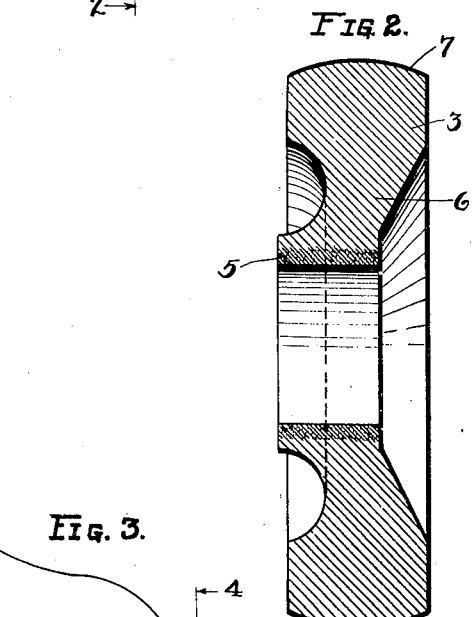
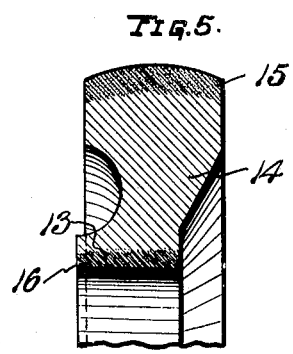
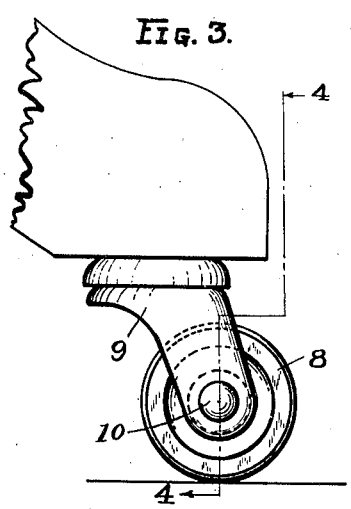
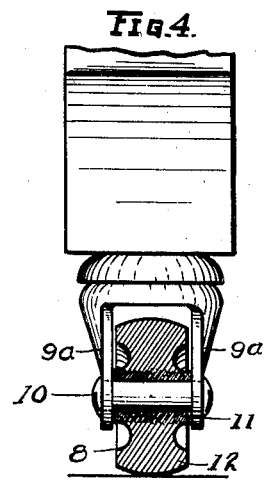

Patented July 20, 1926.

1,593,238

UNITED STATES PATENT OFFICE.

ALBERT H. BASLER, OF CLEVELAND, OHIO.

MOLDED-WHEEL DEVICE.

Application filed November 9, 1925. Serial No. 67,765.

This invention relates to rollers, casters, pulleys, wheels and the like which are formed of moldable material and are adapted to withstand comparatively mild service demands, such as operation at slow speed, for short periods of time, or under light loads, or any combination of these conditions. In particular, it is concerned with a device of the class described formed from plastic, vulcanized rubber material and with a method of making the same.

One important object of the invention is to construct from moldable material a device of the class described and having as an integral part thereof an antifriction hub or axle engaging surface.

Another object is to construct a device of the class described composed of rubber material and having a self lubricating hub.

In the drawings attached to and forming a part of this specification:—

Fig. 1 is a perspective view of one form of device embodying my invention, assembled with a fragmentary portion of a vacuum cleaner;

Fig. 2 is a sectional view of the device taken on line 2—2 of Fig. 1;

Fig. 3 is a side elevation of another embodiment of my invention;

Fig. 4 is a vertical section of the device of Fig. 3 taken on line 4—4; and

Fig. 5 is a vertical section similar to Figs. 2 and 4 but showing still another modification of my invention.

Referring first to Figs. 1 and 2, 1 indicates the portion of a vacuum cleaner from which an axle 2 projects, and 3 indicates a roller or wheel embodying my invention rotatably mounted on the axle 2, where it is retained in position by a cotter pin 4 with or without a washer (not shown). The roller 3 is formed from moldable material, preferably vulcanizable rubber material. As here shown, it consists of an axle engaging hub portion 5 which is impregnated with lubricant, for example graphite comprising from about 5% to about 20% thereof and a web 6 including a tread surface integrally united to the hub. The hub and web are preferably composed of material which, when vulcanized, will be sufficiently hard and strong to support the loads to be imposed thereon without flattening or becoming seriously misshaped. For many uses the web and tread may be soft enough not to mar, scratch or injure objects with which it contacts, for example furniture or floors.

In Figs. 3 and 4 I have shown a roller or wheel 8 assembled with a caster fork 9 to constitute a complete caster for a piece of furniture. The fork 9 carries an axle 10 which extends through the roller 8. The roller 8 is composed of a lubricant-impregnated hub 11 having exposed ends and a web 12 having a tread surface. As shown, this hub 11 is of sufficient length at either end substantially to contact with the adjacent arm 9$^a$ of the caster fork 9 with which it has non-frictional contact. The lubricant-impregnated hub 11 will thus not only run against the axle 10 but also against the arms 9$^a$ of the caster fork with decreased friction, due to the lubricant in the hub. In this manner squeaks and other noises in such devices and traceable to friction may be avoided without deterioration of the material as often results from applying oil to rubber materials. Moreover, the dirt and stains due to dripping oil are also avoided.

In Fig. 5 I have shown a wheel or roller consisting of a lubricant-impregnated hub 13 and a web 14 both relatively hard and a tread 15 of molded material somewhat softer than the hub and web. The hub 13 has exposed antifriction ends 16 similar to the hub 11 of Figs. 3 and 4.

Although I prefer to employ vulcanizable rubber compositions in practicing my invention, I regard many other moldable or plastic materials as suitable for the purposes of my invention including bakelite in plastic or powdered form, fibre, shellac compounds, suitable asphaltum, and carbonaceous materials, celluloid and in general any moldable material having the necessary strength.

Rollers, wheels and the like may be constructed of rubber material in accordance with my invention by various methods, such as follows: A rubber composition is prepared containing a suitable quantity of lubricant, for example graphite, and is then rolled into a thin tube preferably about a mandrel of suitable shape. Then another rubber composition containing the desired ingredients is placed around and in contact with the first composition on the mandrel to the desired thickness. Then the materials are cut to form thin discs of slightly greater dimensions than those desired in the finished article. After the discs are cut they are placed in a mold of the desired configuration and subjected to pressure and heat until they take the desired form and size and have been vulcanized to the desired extent.

It will be understood by those skilled in the art that I have provided a roller, wheel or the like having a load supporting web and tread and a hub lubricated in such a manner that the lubricant will not be detrimental to the material comprising the article. Devices embodying my invention are particularly applicable to electric devices, for example vacuum cleaners and other household apparatus, but are also suitable for use as furniture caster wheels, idler pulleys, wheels for toys and in other analogous mechanism. In general it may be said to be applicable wherever a load is to be moved for a short period of time or intermittently, or a lighter load for a longer period, or where the speed of movement is comparatively slow. Of course, the weights to be carried may vary over a range within the load carrying capacity of the composition constituting the rollers.

When moldable material in powdered or similar form is used instead of a plastic material, it may be placed in a mold with the lubricant containing part at the part which is to constitute the hub of the wheel and thereafter press and harden the material.

Having thus described my invention so that those skilled in the art may be enabled to practice the same, what I desire to secure by Letters Patent is defined in what is claimed.

What is claimed is:—

1. A one piece, light duty, caster wheel, composed of vulcanized rubber material and comprising a perforated hub portion having lubricant impregnated end and inner peripheral surfaces to engage rotatably with relatively immovable members supported thereby, and an outer portion including a tread relatively soft as compared with the remainder of the outer portion and disposed on the periphery thereof to run on a supporting surface.

2. A one piece, light duty, caster wheel, composed of vulcanized rubber material and comprising a perforated hub portion having lubricant impregnated end and inner peripheral surfaces to engage rotatably with relatively immovable members supported thereby, and an outer portion having a tread on the outer periphery thereof to run on a supporting surface.

3. A one piece, light duty, caster wheel, composed of vulcanized rubber material and comprising a perforated hub having a lubricant impregnated inner peripheral surface to engage rotatably with a relatively immovable axle supported thereby, and an outer portion having a tread on the outer periphery thereof to run on a supporting surface.

4. A one piece, light duty, caster wheel, composed of vulcanized rubber material and comprising a perforated hub portion having a lubricant impregnated inner peripheral surface to engage rotatably with a relatively immovable axle supported thereby, and an outer portion including a tread relatively soft as compared with the outer portion and disposed on the periphery thereof to run on a supporting surface.

In testimony whereof I hereunto affix my signature this 6th day of November, 1925.

ALBERT H. BASLER.